United States Patent [19]

Beech et al.

[11] 4,329,945
[45] May 18, 1982

[54] APPARATUS FOR METERING FUEL ADDITIVES TO INTERNAL COMBUSTION ENGINES

[76] Inventors: Harvey E. Beech, 18564 Clark St., Apt. 20, Tarzana, Calif. 91356; Richard M. Bird, 4565 Larkwood Ave., Woodland Hills, Calif. 91364

[21] Appl. No.: 177,062

[22] Filed: Aug. 11, 1980

[51] Int. Cl.³ .......................................... F02M 25/02
[52] U.S. Cl. .............................. 123/25 B; 123/25 P; 123/25 L; 123/25 J
[58] Field of Search ................ 123/25 B, 25 D, 25 P, 123/25 J, 25 L, 198 A

[56] References Cited

U.S. PATENT DOCUMENTS

| | | |
|---|---|---|
| 2,533,863 | 12/1950 | Wirth et al. ........................ 123/25 J |
| 2,715,894 | 8/1955 | Shirrell .............................. 123/25 B |
| 3,911,871 | 10/1975 | Williams et al. .................... 123/25 L |
| 4,059,078 | 11/1977 | Ramiro de la Rosa ............ 123/25 P |
| 4,064,842 | 12/1977 | Sherrill ............................. 123/25 L |
| 4,125,092 | 11/1978 | Tnamura ........................... 123/25 B |
| 4,161,160 | 7/1979 | Hicks et al. ....................... 123/25 B |
| 4,208,989 | 6/1980 | Hart .................................. 123/25 B |

Primary Examiner—Ira S. Lazarus
Attorney, Agent, or Firm—Charlton M. Lewis

[57] ABSTRACT

Control apparatus is described for metering a liquid additive to be vaporized and introduced to the fuel mixture for an internal combustion engine. Improved enhancement of the combustion process is obtained by supplying the additive in accurate and reliable dependence upon the condition of operation of the engine, as represented by the pressure in the intake manifold. Such control is made possible by a pressure responsive valve having a valve member movable with low friction along the length of a narrow valve orifice of uniform width. The resulting flow is then linearly related to the movement of the valve member, and provides sensitive and accurate control even at extremely low flow rates. A complete system for combustion enhancement employing such a valve and associated control features is described. Independently adjustable springs at opposite ends of the valve member provide separate adjustment of the flow for engine operation at high and low power conditions.

8 Claims, 6 Drawing Figures

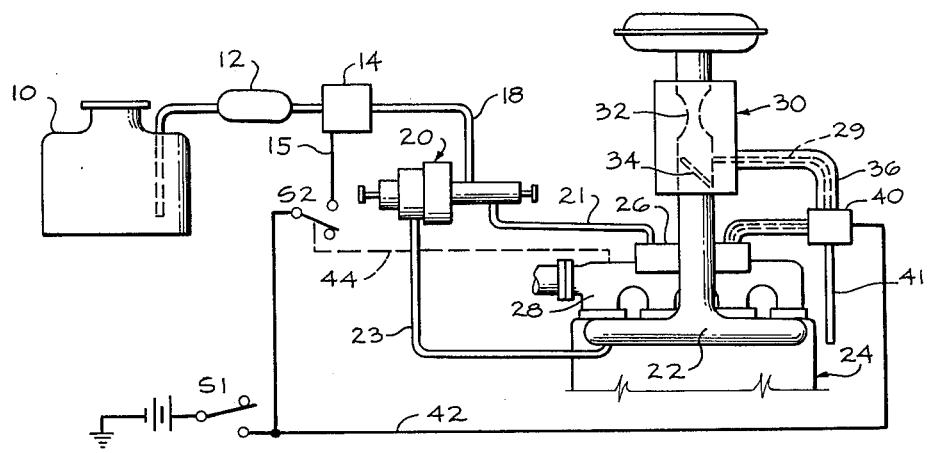
FIG. 1
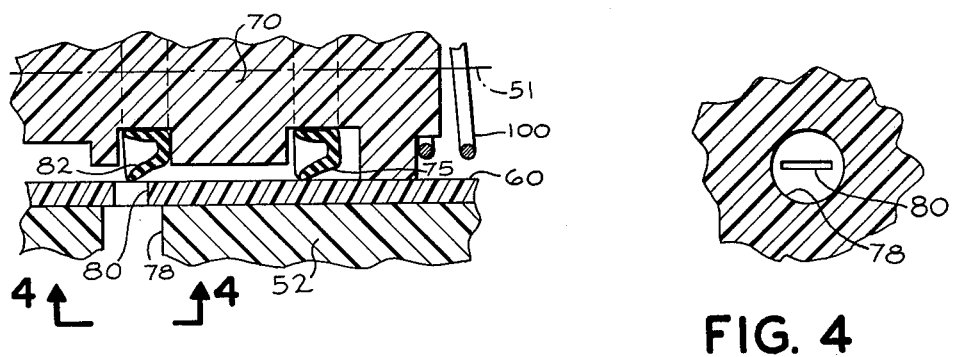
FIG. 3
FIG. 4
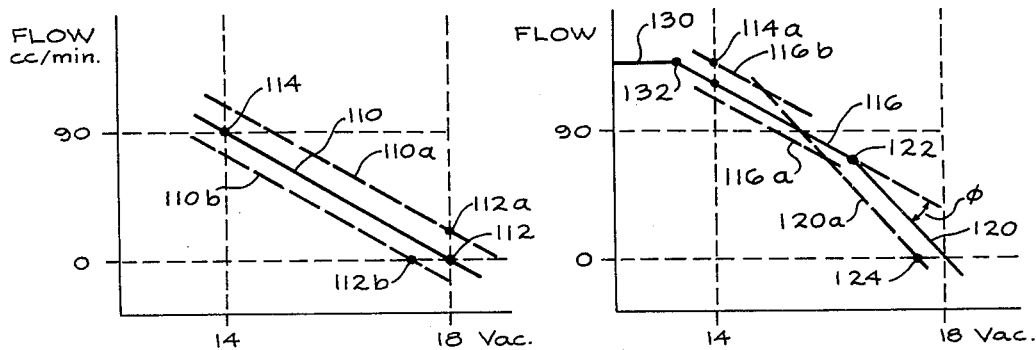
FIG. 5
FIG. 6

APPARATUS FOR METERING FUEL ADDITIVES TO INTERNAL COMBUSTION ENGINES

BACKGROUND OF THE INVENTION

This invention has to do with apparatus for enhancing the combustion process in internal combustion engines by introduction of suitable additives in vaporized form into the air stream entering the engine.

It has long been recognized that injection of a vaporized additive, such as water or an alternative fuel, for example, can modify the combustion process in a useful way. Addition of water vapor to the combustion mixture tends to retard the combustion rate, permitting higher compression ratios without such conventional gasoline additives as lead compounds. Injection of vaporized water at high temperature further promotes complete vaporization of the conventional fuel, producing more complete combustion and affording better control of undesired exhaust emissions. Potentially useful supplemental fuels, such as alcohol, for example, when in liquid phase are soluble in gasoline only to a limited extent, but can be introduced in virtually arbitrary proportions when vaporized and added to the air stream downstream of the carburetor.

Numerous mechanisms have been proposed for controlling the supply of such additives to the fuel mixture of an internal combustion engine in response to varying conditions of engine operation. However, there has been little agreement as to the most desirable control action, and many of the proposed control mechanisms appear to have been only marginally effective in producing the particular action that was intended.

We have found that optimum enhancement of the combustion process requires accurate control of the rate at which an additive is supplied, together with smooth and reliable variation of that rate in accordance with the varying conditions of engine operation. Moreover, that control should extend with sensitive response and with accurate repeatability over the entire operating range of the engine.

More particularly, we have found that, although a typical engine requires little or no additive when idling, even a very light load, or a slight increase in engine speed, calls for a corresponding increase in the additive supply. Thus the control mechanism must respond accurately to the condition of operation even within the range of extremely low flow rates.

Many conventional valve mechanisms are designed primarily for shifting rapidly between closed and open conditions. Although such valves necessarily progress through a multitude of partially open intermediate conditions, their transitions between such states ordinarily cannot be controlled accurately and do not occur in a strictly repeatable manner.

SUMMARY OF THE INVENTION

An important aspect of the present invention provides a valve structure capable of varying the flow rate with improved smoothness and repeatability over the entire range from zero to maximum available flow. Moreover, in preferred form of that valve structure, the flow rate is varied in direct proportion to the mechanical movement of the valve member.

That linearly proportional control action is attained by forming in a wall of the valve chamber a valve orifice in the form of a long narrow slot of uniform width, and causing the valve member to move along the length of the slot in sealed relation to the chamber wall. The effective part of the valve orifice is then the portion that is uncovered by the valve member, and its area is directly proportional to the linear movement of the valve member. That is, at all valve positions a given increment of movement of the valve member produces always the same increment of the flow rate.

With such a control valve, any desired functional relationship between flow rate and a selected control parameter can be obtained by driving the valve member by a mechanism that is responsive to the parameter and produces movement of the valve member having the desired functional relation. Such control mechanism may comprise, for example, a suitably designed cam or linkage, or a servo drive responsive to the control parameter. The resulting flow rate produced by the valve then follows the same functional dependence upon the control parameter as the valve member movement. Such linear response within the valve itself has the great advantage that overall linear response of the mechanism to a control parameter such as the movement of a pressure responsive diaphragm, for example, can be obtained with high accuracy by coupling the diaphragm directly to the valve member.

A particular advantage of the described type of valve structure is that its overall precision of response can in general be improved by increasing the length of the valve orifice relative to its width. The longer the slot length the less is the relative effect of any play or other slight inaccuracy in the drive of the valve member, while a very small slot width insures sensitive control even at extremely low values of the flow. For the present purpose the ratio of slot length to width is preferably made equal to at least about ten, and may usefully be made as great as 100 or more.

The present valve structure is especially suitable for systems in which the control parameter is a fluid pressure. For example, as has previously been suggested, the flow rate of a fuel additive supplied to an internal combustion engine can be made to depend upon the vacuum in the intake manifold of the engine. That vacuum is known to vary in a definite manner with such factors as the speed and power output of an engine, progressing from a relatively high numerical value when the engine is idling to a relatively low value at high speed and power. The magnitude of the vacuum is thus an approximate inverse measure of the rate at which the engine is receiving its primary fuel, and can be used as an inverse measure of the required rate of additive supply.

The present invention makes that type of control fully effective for the first time by insuring sensitive variation of the additive supply even at the very low values typical of idling condition, together with uniform incremental control of additive supply all the way up to the relatively high flow rates typical of full power operation.

BRIEF DESCRIPTION OF THE DRAWING

A full understanding of the invention, and of its further objects and advantages, will be had from the following description of certain preferred manners of carrying it out. The particulars of that description, and of the accompanying drawing which forms a part of it, are intended only as illustration and not as a limitation upon the scope of the invention, which is defined in the appended claims.

In the drawing:

FIG. 1 is a schematic elevation representing an illustrative additive metering system embodying the invention;

FIG. 3 is a fragmentary section corresponding to a portion of FIG. 2 at enlarged scale;

FIG. 4 is a section on line 4—4 of FIG. 3;

FIG. 5 is a schematic graph illustrating one mode of valve action;

FIG. 6 is a schematic graph illustrating another mode of valve action.

DESCRIPTION OF ILLUSTRATIVE EMBODIMENT

Figure 2:
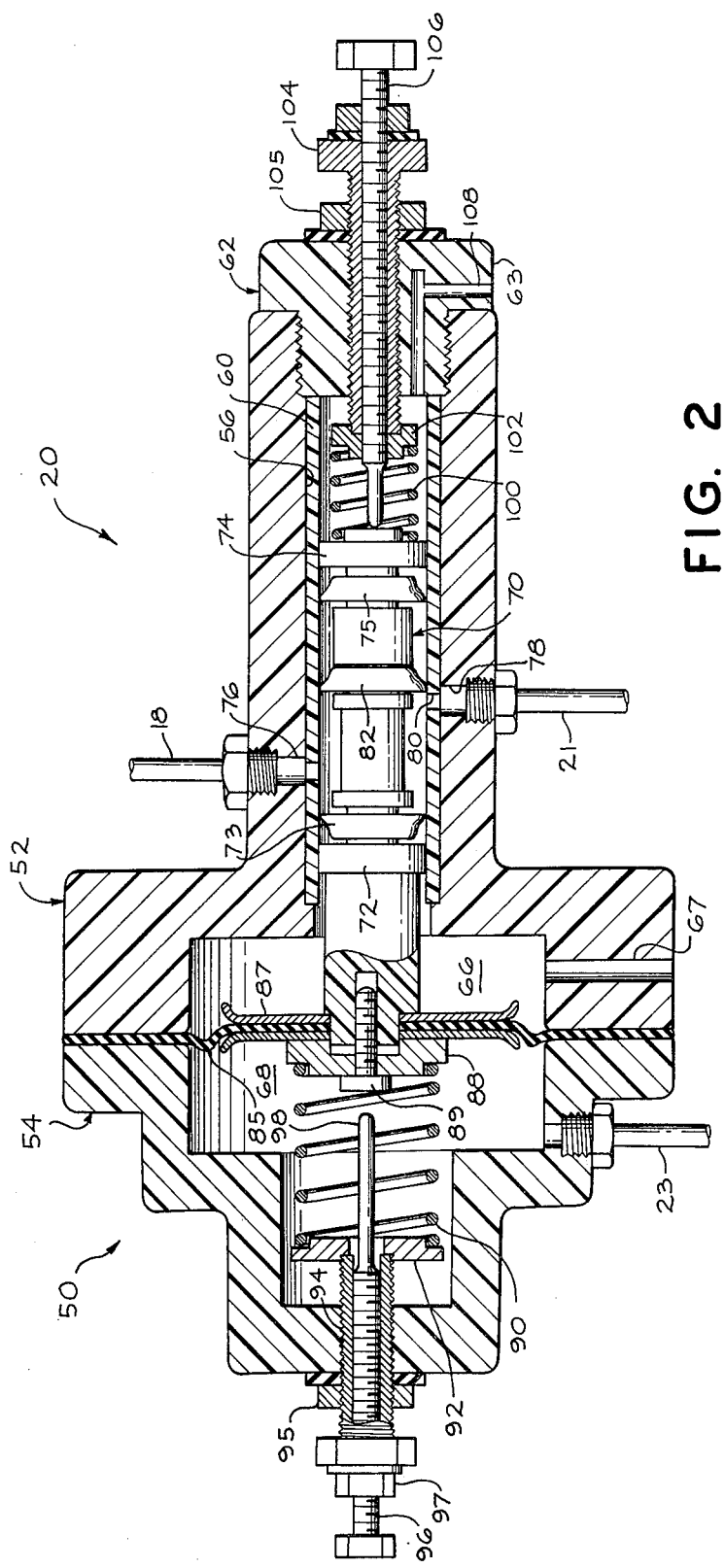
FIG. 2 is an axial section representing a metering valve according to the invention.

As shown schematically in FIG. 1, liquid additive is supplied from the tank 10 via the filter 12 to the pump 14, which is typically driven electrically under control of the power line 15. Pump 14 supplies additive via the line 18 at a regulated pressure such as four or five psi, which may be adjustable. The pressurized liquid additive from line 18 is metered by the control valve 20, shown in further illustrative detail in FIG. 2. The valve outlet line 21 receives liquid at a flow rate which varies automatically under accurate control in accordance with the condition of engine operation, as represented by the pressure at the intake manifold 22 of the engine 24. That manifold pressure is supplied as control parameter to the metering valve via the line 23.

The metered liquid additive from line 21 is converted to vapor phase in the vaporizer 26, which typically obtains its heat from the exhaust manifold 28 or from a section of the exhaust pipe close to that manifold. The vaporizer may, for example, be formed integrally with the exhaust manifold, may have the form of a shallow tank of copper or the like in intimate contact with the exterior surface of the exhaust manifold, or may include a portion of corrosion resisting material which projects through the manifold wall and receives heat directly from the hot exhaust gases. The detailed design of the vaporizer preferably provides rapid response to variations of the input flow rate, while insuring production of dry vapor free from any liquid, even at maximum flow rates. The output line 29 from the vaporizer may include suitable means, not explicitly shown, for stripping from the outgoing vapor any liquid droplets that may be present.

Vaporizer output line 29 leads to the engine carburetor assembly 30, where it may tap into the airstream at any desired point. It is generally preferred to introduce the vaporized additive to the gasoline-air mixture downstream of the carburetor venturi 32 in order to avoid cooling the additive vapor by the venturi expansion. And the additive is preferably introduced upstream of the throttle valve 34 so that line 29 will be separated by that valve from the full vacuum of the intake manifold, especially when the engine is idling or operating at moderate power. With that preferred point of connection, the pressure within line 29 is maintained substantially constant under all conditions of engine operation. Hence there are no major pressure variations in that line or in vaporizer 26 such as might distort the rate of delivery of vaporized additive to the carburetor airstream.

Vaporizer output line 29 is preferably well insulated, as indicated at 36, to prevent condensation of the additive vapor stream even at relatively low flow rates. The insulation also insures delivery of the vapor at maximum temperature, enhancing its tendency to preheat the fuel mixture and to vaporize any liquid gasoline droplets in the carburetor output airstream.

A dump valve 40 and associated drain tube 41 are preferably connected at an intermediate point of vapor line 29. Valve 40 is controlled in any suitable manner such that line 29 is open to the carburetor when the engine is operating, and the flow is automatically switched to the drain tube 41 when the engine is stopped, cutting off additive flow to the carburetor assembly and relieving any excess pressure in vaporizer 26 during idle condition of the engine. For example, the dump valve may comprise a three-way solenoid controlled valve inserted in line 29 with its solenoid connected via the line 42 in series with the ignition switch S1 of the engine.

When the engine is shut down, all flow of additive from source 10 is preferably stopped, as by turning off pump 14. That can be done conveniently by connecting the pump power line 15 in series with ignition switch S1. It is preferred, however, to include also in the pump control circuit a time delay mechanism which will delay start of the pump when the engine is first started until the exhaust manifold and vaporizer have become hot enough to vaporize the liquid additive. As illustratively shown in FIG. 1, there is inserted in line 15 the switch S2, which typically comprises a normally open thermally controlled switch mounted in suitable heat conductive relation to exhaust manifold 28, or directly to vaporizer 26. The pump then operates only if the ignition switch is turned on and also the vaporizer temperature is above a selected threshold. Such coupling of switch S2 to exhaust manifold 28 is indicated schematically by the broken line 44.

Metering valve 20, as illustratively shown in axial section in FIG. 2, comprises the generally cylindrical valve housing 50, typically formed of the main housing member 52 and the cover 54, which are connected on the axis 51 by the screws 53. Main housing member 52 is provided with the coaxial through bore 56 in which the sleeve 60 is mounted, typically with a light press fit. The sleeve is positioned at its inner end by the shoulder 58, formed by the internal housing flange 59, and at its outer end by the plug 62, which is threaded in bore 56 to a depth positively limited by the plug flange 63. With suitable dimensioning of the parts, and with addition of a light sealant if needed, the ends and outer surface of the sleeve can readily be made to fit virtually hermetically in the housing.

The valve spool 70 is freely slidable axially within housing sleeve 60, guided by the inner and outer spool flanges 62 and 64. The fit of those flanges in the sleeve preferably combines close definition of the spool movement with sufficient clearance to minimize frictional resistance. The valve spool is provided with the two annular end seals 73 and 75, which are typically close to the respective guide flanges 72 and 74. Those seals define the annular valve chamber 77 to which the working fluid is limited. Fluid enters that chamber from the inlet line 18 via the radial passage 76 through the housing wall and sleeve 60. That passage is fully open in all working positions of the valve spool. The fluid leaves the valve to enter outlet line 21 via the orifice 80 in sleeve 70 and the aligned clearance bore 78 in the housing wall. The metering action is performed by the metering seal 82 which cooperates with outlet orifice 80, exposing varying portions of that orifice to the incoming fluid.

In accordance with the present invention, valve orifice 80 comprises a relatively long and very narrow slot directed axially (FIG. 4) and extending all the way through sleeve 70 or its equivalent. The diameter of clearance bore 78 is preferably at least slightly greater than the slot length, so that fluid entering any portion of the slot from the valve chamber has essentially equal access to the bore. Axial movement of the valve spool causes metering seal 82 to move along the length of slot 80, uncovering varying lengths of the valve orifice to the input fluid and thereby producing a corresponding variation in the rate of flow through the valve. With a metering slot of uniform width, as is ordinarily preferred, the variations in flow rate are strictly linearly related to the axial valve movement.

The invention preferably employs seals at all three positions 73, 75 and 82 of the type known generally as U-type packings, which comprise rings of resilient material having a cross section of U-shape with the U opening parallel to the axis. The ring is set in an annular channel of generally rectangular section. The radially inner arm of the U-section rests approximately flatly on the bottom of the channel. The other arm is biased radially outward by the resilience of the ring material. With suitable dimensioning of the parts, the tip of the outer arm is pressed lightly against the inner face of the surrounding cylindrical member, which in the present instance is sleeve 70. The two end seals 73 and 75 are set with their U-sections opening toward each other, and valve seal 82 has the U directed toward inlet passage 76. Under that condition, the pressure of the fluid tends to open the U, insuring reliable contact between the sealing lip and the sleeve face. We have found that, especially with the relatively low fluid pressure that is preferably employed, the sealing lip of a U-type packing can provide reliable sealing with a very light resilient pressure, and moved across the valve slot smoothly and without any damage to itself. The very light contact pressure at which the seals thus operate permits the valve spool to move within sleeve 60 with very low friction. Hence the valve position can adjust to each new balance of control forces with unusual sensitivity and accuracy.

That smoothness of valve movement is further increased, in preferred form of the valve structure, by forming sleeve 60 of a material having particularly low coefficient of friction, such, for example, as tetrafluroethylene resin, known generally by the trademark Teflon. We have found that in such material having a wall thickness of the order of 0.05 inch, for example, through slots can be formed and employed effectively for the present purpose having a length of the order of a tenth of an inch and a width of about two to five mils.

The diameter of axial housing bore 56 is greatly increased to the left of flange 59, as seen in FIG. 2, defining with cover 54 an enlarged chamber for accommodating the pressure responsive diaphragm 85. The diaphragm periphery is typically clamped in sealed relation between main housing member 52 and cover 54. Valve spool 70 is directly coupled at its inner end to the center of diaphragm 85, as by the clamping action of the mounting disks 87 and the retaining washer 88 and screw 89. That clamping structure stiffens a large central area of the diaphragm and seals the junction between it and the valve spool. Diaphragm 85 thus divides the diaphragm chamber into the reference chamber 66 on the side of the valve spool and the control chamber 68 on the side of the cover.

Reference chamber 66 is typically open to the atmosphere via the vent orifice 67, which may include a conventional air filter. Control chamber 68 communicates via the bore 69 and line 23 with engine intake manifold 22 (FIG. 1), and is thereby maintained continuously at a variable pressure corresponding to the engine vacuum. Since that control pressure is less than the atmospheric reference pressure (except under highly specialized and unusual conditions of engine operation), the force exerted by the diaphragm upon valve spool 70 is normally directed axially toward cover 54, that is, to the left as seen in FIG. 2. The magnitude of that force is substantially linearly proportional to the magnitude of the vacuum, by which is meant, more precisely, the absolute value of the difference between the atmospheric reference pressure and the sub-atmospheric control pressure at the intake manifold.

That control force exerted on the valve spool by the diaphragm is opposed by the yielding resilient force exerted in the opposite direction by the primary coil spring 90. The active end of that spring, at the right in FIG. 2, is typically seated directly on retaining washer 88, and the reference end of the spring is supported on the seat 92. That seat is axially adjustable by rotation of the sleeve 94, which is threaded coaxially in cover 54 and provided with the hexagonal head 93 and the lock-nut 95. The screw 96 is threaded in sleeve 94 and provided with the lock-nut 97. The end 98 of that screw forms an adjustable positive stop for limiting leftward movement of valve spool 70. Any slight air leakage along the screw threads of sleeve 94 and screw 96 is normally negligible, but can be substantially eliminated by sealing washers under the respective lock-nuts.

In preferred form of the invention an auxiliary spring 100 is provided at the end of spool 70 opposite to primary spring 90. The reference seat 102 for spring 100 is made adjustable, as by the threaded sleeve 104 and lock-nut 105. The inner screw 106 is preferably threaded in sleeve 104, providing an adjustable stop for the right-hand travel of the valve spool. Auxiliary spring 100 is typically made from one quarter to one half as stiff as spring 90. The chamber surrounding auxiliary spring 100 is preferably maintained at atmospheric pressure, as by the vent passage 108. The vacuum in control chamber 68 then acts effectively on the area of the left-hand end of the valve spool as well as the annular area of the diaphragm proper.

Springs 90 and 100 are preferably formed with a normal length at least five or ten times the normal travel of the valve spool between fully open and fully closed positions of valve orifice 80. The adjustment of spring 100 preferably has sufficient range either to maintain spring contact with the valve spool throughout that valve travel or to withdraw the spring from such contact throughout that travel; it is then possible also to limit spring action to a desired portion of that travel.

Turning now to the overall operation of the described system, when engine 24 is turned off at open ignition switch S1, additive pump 14 is idle and no liquid is supplied to valve 20. Also, valve 40 is in idle condition, isolating tube 29 from vaporizer 26 and connecting the vaporizer to vent tube 41. Carburetor 30 is thus protected from any accidental flow of vapor or liquid from the vaporizer. Metering valve 20 is typically in fully open position with spool 70 shifted to the right against stop screw 106 by the action of spring 90, as shown in FIG. 2. However, liquid flow through the metering valve is prevented by idle condition of pump 14.

When ignition switch S1 is closed to start the engine, valve 40 is immediately operated, connecting line 29 to the vaporizer. However, power for liquid pump 14 continues to be interrupted at switch S2. As the engine starts to operate, the pressure in intake manifold 22 decreases rapidly and tends to stabilize at the relatively high vacuum characteristic of idling condition of the engine. Metering valve 20 is thereby shifted to the left from the idle position of FIG. 2 until the force developed across diaphragm 85 is in equilibrium with the spring forces, typically with valve orifice 80 nearly, or entirely, closed. Liquid flow continues to be cut off at pump 14.

As the engine warms up, the rising temperature of exhaust manifold 28 operates thermal control 44, closing switch S2 and causing pump 14 to supply liquid additive at the set supply pressure to line 18. That liquid is controlled by metering valve 20 in accordance with the intake manifold vacuum. Under idling condition of the engine only a small flow of additive is typically supplied to vaporizer 26. As more power is demanded of the engine, metering valve 20 progressively opens in response to the decreasing value of the manifold vacuum.

That action is represented schematically in illustrative form by the curve 110 of FIG. 5, which covers the vacuum range between 18 inches of mercury, typical of an idling engine, and 14 inches, typical of an automobile cruising at about 55 mph. The valve springs 90 and 100 are assumed adjusted so that both contact the valve spool at all valve positions shown. With the engine idling, the valve is at the point 112, where the diaphragm force due to 18 inches of vacuum is balanced by the opposing force of spring 90 and the aiding force of auxiliary spring 100. The springs are assumed to be so adjusted that this equilibrium occurs with the valve orifice 80 just closed, yielding zero flow of liquid additive as shown at the left of the graph. At cruising speed, the lower vaccum of 14 inches allows spring 90 to shift the valve spool to the point 114, partially opening the valve and producing a flow shown illustratively as 90 cc per minute. At that position spring 90 has expanded and therefore exerts less force on the valve spool, whereas spring 100 has been compressed and exerts more force than at point 112. Both those changes of spring force tend to compensate the lower vacuum. The straight line 110 between the two points 112 and 114 corresponds to the linear action of each spring and the linear response of the valve orifice, already described.

If, now, the tension of spring 90 is increased by rotation of sleeve 94, tending to drive the valve spool more strongly to the right in FIG. 2, the entire curve 110 is shifted bodily to higher values of vacuum, and hence to the right in FIG. 5, for example to the position 110a. That change represents a uniform increase of additive flow for any given value of the manifold vacuum. Idling condition of the engine is thereby shifted to the point 112a, providing a definite small flow of additive to the vaporizer. A similar effect is obtained by decreasing the tension of auxiliary spring 100. Adjustment of either spring in the opposite direction produces the opposite result, shifting the curve to 110b, say. That typically establishes an operating range of vacuum values between points 112 and 112b in which the additive supply is zero. Such adjustments thus provide a convenient means for setting a desired additive flow when the engine is idling, or a threshold value of vacuum at which the valve starts to supply additive as the power level of the engine is increased.

A distinctly different performance is obtainable by backing off adjustment sleeve 104 until auxiliary spring 100 contacts the valve spool only during a selected low vacuum portion of the spool travel. The single rectilinear curve 110 of FIG. 5 is then replaced by a curve of the form shown typically in FIG. 6, comprising the two segments 116 and 120 which intersect at 122 at a definite angle shown arbitrarily as $\phi$. The segment 116 corresponds to the portion of the valve travel during which the engine vacuum is relatively low and both springs 90 and 100 contact the valve spool. The slope of that curve segment is the same as the slope of curve 110 in FIG. 5. The other curve segment 120 corresponds to the range of relatively high vacuum, at which diaphragm 85 draws the valve spool to the left in FIG. 2 out of contact with auxiliary spring 100. With only primary spring 90 effective, a given change of vacuum requires more valve travel to rebalance the forces, causing the slope of segment 120 to be steeper than that of 116. The angle $\phi$ between the two curves depends upon the relative strength of the springs, increasing with the ratio of the spring constant of auxiliary spring 100 to that of primary spring 90.

The type of valve action represented in FIG. 6 has the advantage that the additive supply is separately adjustable in the range of engine operation at relatively low power and at relatively higher power. Thus, the additive supply is independently adjustable for the two particularly important conditions of engine operation: idling and cruising.

More particularly, adjustment of primary spring 90 shifts both segments of the curve through the same horizontal increment, as indicated illustratively for decreased spring tension by the curves 116a and 120a. Such adjustment of spring 90 is typically used to set a desired position of curve segment 120, where only that spring is effective. The desired position of low vacuum curve segment 116 is then obtained by adjustment of auxiliary spring 90, which shifts that segment only, as indicated by the curve 116b. Thus, for example, a desired threshold value of vacuum at the point 124 may be obtained by adjusting spring 90, and the additive flow during cruising may then be set to the relatively high level 114a by adjustment of spring 100.

The two adjustable stop screws 96 and 106 provide useful modification of the additive supply under certain specialized condition of operation. For example, when a vehicle is going down a slope at constant speed, or is decelerating on a level road, the throttle is typically nearly closed while the engine is still driven at relatively high speed. The intake manifold vacuum may then be higher than the normal idling vacuum, tending to cut off all flow of additive. That effect can be prevented, and the flow maintained at or close to the idling value, by setting stop screw 96 to contact the valve spool as it reaches its normal idling position.

As a further example, when the engine is operating at abnormally high speed and power, causing the vacuum to decrease to abnormally low values, the actual flow of fuel and air to the intake manifold tends to increase more slowly than the vacuum decreases. Under such nonlinear behavior of the carburetor it is usually desirable to set stop screw 106 in position to check the increase of additive beyond a selected flow rate. That action may be viewed as adding to the previously described curves of FIG. 6 a third segment 130 which extends from a selected point 132 of segment 116 horizontally to the left for an indefinite distance. Such a third segment is especially useful in systems for supplying an auxiliary fuel such as methanol as additive, since it then prevents supply of an excessive ratio of methanol relative to the conventional fuel actually supplied from the carburetor.

In preferred form of the invention, the parts are so dimensioned and the spring constants so selected with respect to the area of the diaphragm that throughout substantially the entire normal operating conditions of the engine the equilibrium position of the valve spool is within the length of the slot which forms the valve aperture. Within that range any incremental movement of the valve produces a corresponding change in the length of slot exposed to fluid flow, and therefore causes a substantially proportional flow increment.

We claim:

1. Valve means for metering a liquid fuel additive from a source of pressurized additive to a vaporizer for supplying vaporized additive to the intake manifold of an internal combustion engine, said valve means comprising structure forming a wall separating the source from the vaporizer and having an elongated aperture of uniform width, a valve member movable along the length of the aperture in sealed relation to the wall to progressively expose a variable length of the aperture and thereby meter additive to the vaporizer at a rate that is proportional to the valve member movement, and control means for driving the valve member in its said movement in inverse relation to the absolute value of the vacuum in the intake manifold of the engine.

2. Valve means according to claim 1 wherein said control means comprise means for applying to the valve member a yielding driving force which acts in aperture covering direction and varies directly with the absolute value of the vacuum in the intake manifold of the engine, and means for applying to the valve member oppositely directed resilient forces which are independently adjustable.

3. Valve means according to claim 2 including independently adjustable stop means for confining said movement of the valve member to a limited range which corresponds approximately to the range of normal operating conditions of the engine.

4. Valve means according to claim 1 wherein said control means comprise means for applying a first manually adjustable resilient biasing force to the valve member in aperture exposing direction, means for applying a second resilient biasing force to the valve member in aperture covering direction, said second force being manually adjustable to be effective only within a limited portion of said valve member movement, and means for applying to the valve member a yielding driving force which acts in aperture covering direction and varies in direct relation to the absolute value of the vacuum in the intake manifold of the engine.

5. Valve means according to claim 1 wherein said wall defines a cylindrical valve chamber with said aperture extending axially of the chamber, and the valve member comprises a spool structure axially movable in the chamber and carrying an annular sealing ring of resilient material which slidingly engages the chamber wall.

6. Valve means according to claim 5 wherein said control means comprise first and second spring means biasing the spool structure in aperture exposing and in aperture covering directions, respectively, said second spring means being adjustable to act only within a selected portion of the spool structure movement, and diaphragm means coaxial with the valve chamber and exposed on one face to a pressure derived from the intake manifold of the engine for applying to the valve member a yielding force in aperture covering direction to establish an equilibrium position of the valve member for each value of said pressure, the elastic constant of the first spring means being between about two and about four times that of the second spring means and being so related to the effective area of the diaphragm that the equilibrium positions of the valve member for substantially all normal operating conditions of the engine lie within the length of the aperture.

7. In a system for metering a fluid fuel additive to an internal combustion engine which includes an intake manifold and an exhaust manifold; the combination of a source of pressurized liquid additive, vaporizing means in heat conductive relation with the exhaust manifold for converting liquid additive to vapor, first valve means for metering liquid additive from the source to the vaporizing means in inverse relation to the magnitude of the vacuum in the intake manifold, and second valve means for directing additive vapor from the vaporizing means to the intake manifold during engine operation and to the atmosphere during idle condition of the engine.

8. Combination according to claim 5 wherein said source of pressurized liquid additive comprises a container for liquid additive, pump means energizable for pressurizing liquid additive from the container, and means for energizing the pump means only in response to the combination of engine operation and exhaust manifold temperature sufficient to render the vaporizing means operative.

* * * * *